J. A. BROCK.
Ore Amalgamator.
No. { 1,111. 32,115 }
Patented Apr. 23, 1861.
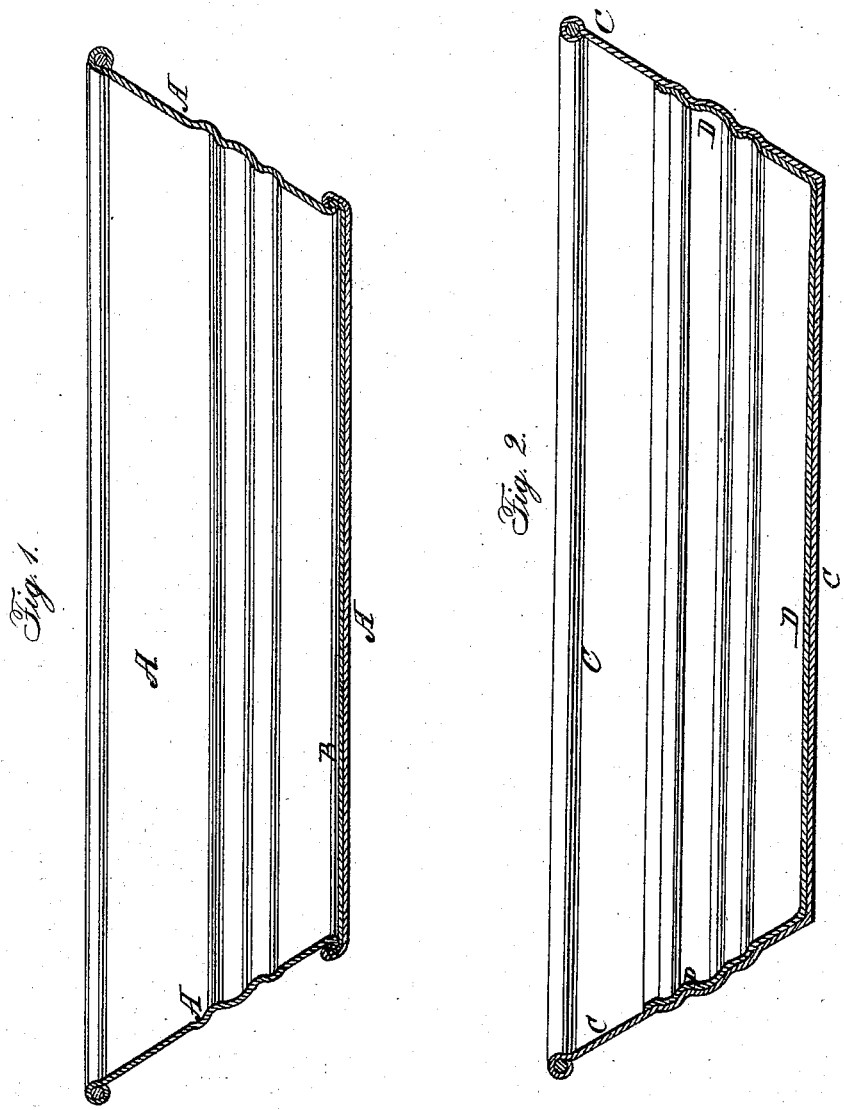
Witnesses:
Goodwin Y. Atlee
Gustavus Dietrich
Inventor:
John A. Brock
by Robt. W. Fenwick
Atty

UNITED STATES PATENT OFFICE.

JOHN A. BROCK, OF CHICAGO, ILLINOIS.

IMPROVED MINING-PAN.

Specification forming part of Letters Patent No. 32,115, dated April 23, 1861.

*To all whom it may concern:*

Be it known that I, JOHN A. BROCK, of Chicago, in the county of Cook and State of Illinois, have invented a new and useful Improvement in Mining-Pans; and I do hereby declare that the following is a full, clear, and exact description of the same, reference being had to the accompanying drawings, forming a part of this specification, in which—

Figure 1 is a vertical section of a mining-pan constructed with my invention. Fig. 2 is a similar section showing a modification of the same.

Similar letters of reference in each of the two figures indicate corresponding parts.

To enable others skilled in the art to make and use my invention, I will proceed to describe its construction and operation.

A in the accompanying drawings, Fig. 1, represents a sheet-metal pan corrugated about midway between the base and its upper edge. The interior surface of the bottom of this pan is lined or covered with copper, platinum, or other metal, B, which possesses the properties to insure a union between it and the mercury used in the pan.

C in Fig. 2 also represents a sheet-metal mining-pan similar in form to that shown in Fig. 1. This pan has the interior surface of its bottom, and also the interior surface of its circumference or rim, to one-half its depth, covered with copper, platinum, or other metal dish, D, with like properties.

The panning utensils now in use are made of sheet-iron, tin, or wood. The sheet-iron pans are mostly made by machinery by being pressed into shape from a single piece of sheet-iron of proper dimensions. Some are made by the old plan of cutting the sheet-iron and seaming together. Some are made of wood, generally turned.

To apply my improvement to a wooden panning utensil, I fasten to the inner surface, with copper tacks or nails, a piece of sheet-copper as large in extent as you wish the mercury to spread; but if the pan is made of sheet-iron pieces and locked or seamed together the inside should be of sheet-copper or other metal substantially the same—to wit, cut the copper in the same-shaped pieces as the iron is cut, with the exception that the side or rim pieces, half as high, (see Fig. 2,) will be sufficient, and for ordinary purposes it will only be necessary to make the bottom of the pan double, the inside piece of copper, or its equivalent, and the outside of any desired material. (See Fig. 2.)

I do not wish to confine myself to any specified manner of the application of my improvement to gold-mining panning utensils, as it may be done in a number of different ways to the same effect; but I make my pan of any form and of any material used for that purpose, and apply to the inside of the pan a metallic surface with which mercury will unite in any practical manner.

I will state the most practical manner of making and applying my improvement is to press two pans in the usual manner, one of sheet-iron, the other of any sheet metal with which mercury will unite—for instance, copper. Make the pans of equal size at bottom. The inside copper one should not be more than half as high as the outside or iron one. Place the copper pan inside the iron one and corrugate the sides together between suitable rollers made for the purpose.

When copper is used for the inner surface of the pans, it may be necessary in some cases to remove the corrode or clean the copper with nitric acid, to allow the mercury to unite immediately. I also coat the opposite side to that exposed to the mercury with coal-tar or other paint that is impervious to water, to prevent the mercury going through the metal with which it unites.

I have found that mercury and amalgam can be retained in the panning utensils much better by corrugating the sides of the pan, as described and shown; also, that the surface of mining-pans in use has a nature repulsive to mercury, which renders the mercury ineffectual in saving gold.

With my panning utensil the mercury can be used in a connected manner, as it is held in a comparatively stationary state and prevented from moving bodily with the dirt; and as the dirt is almost completely surrounded with mercury the surface will be increased nearly one hundred per cent. without increasing the quantity of mercury commonly used in panning utensils.

What I claim as my invention, and desire to secure by Letters Patent as a new article of manufacture, is—

A mining-pan as herein described having a supplementary plate or dish fitted into the interior thereof for the purpose of collecting and holding the mercury used in the panning operation in a fixed position, as and for the purposes set forth.

JOHN A. BROCK.

Witnesses:
 GEO. H. NORRIS,
 GEO. F. NORRIS.